United States Patent
Walker et al.

[15] 3,665,809
[45] May 30, 1972

[54] MULTIPLE CHANNEL REDUNDANT CONTROL SYSTEM

[72] Inventors: Colin Graham Walker, Chomedy, Laval; Edward John Leadbeater, Montreal; Ralph Fredrick Darlington, Lachine; Edmond Michael Traczyk, Val Morin, Quebec, all of Canada; Charles A. Kubilos, Oxnard, Calif.

[73] Assignee: Abex Corporation, New York, N.Y.

[22] Filed: Aug. 19, 1970

[21] Appl. No.: 65,104

[52] U.S. Cl. ........................................91/363 A
[51] Int. Cl. ........................F15b 9/03, F15b 9/09
[58] Field of Search ...............................91/363 A

[56] References Cited

UNITED STATES PATENTS

| | | | |
|---|---|---|---|
| 3,408,024 | 10/1968 | Iverson | 91/363 A |
| 3,426,650 | 2/1969 | Jenny | 91/363 A |
| 3,540,350 | 11/1970 | Heine | 91/363 A |

Primary Examiner—Paul E. Maslousky
Attorney—Wood, Herron & Evans

[57] ABSTRACT

A multiple channel redundant electro-hydraulic servo system for controlling an aircraft guidance element. This system is redundant so that upon failure of one or more channels of the system, the remaining active channels still maintain control of the guidance element with a minimum of transient shift during shutdown of the failed channel.

12 Claims, 12 Drawing Figures

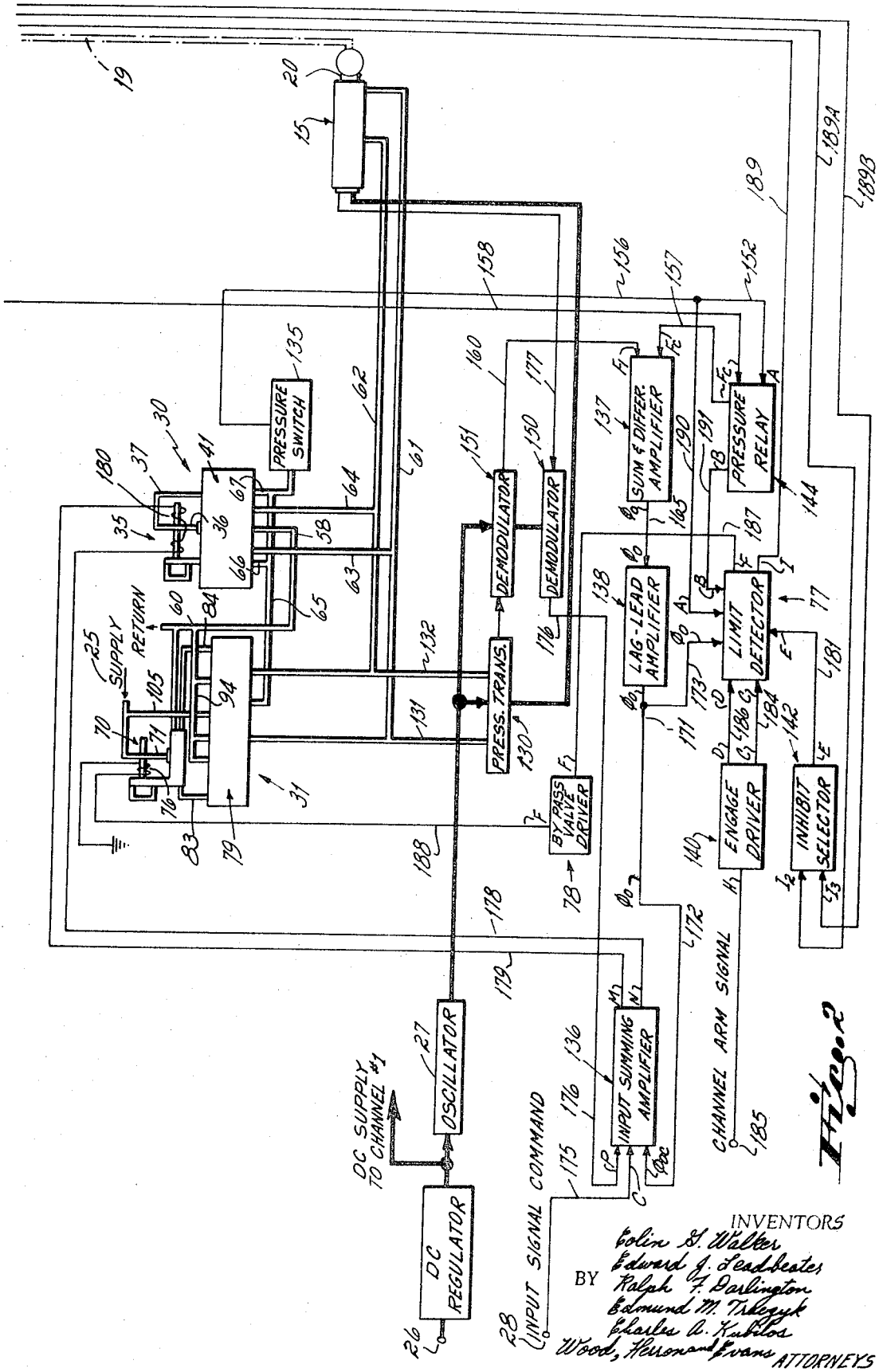

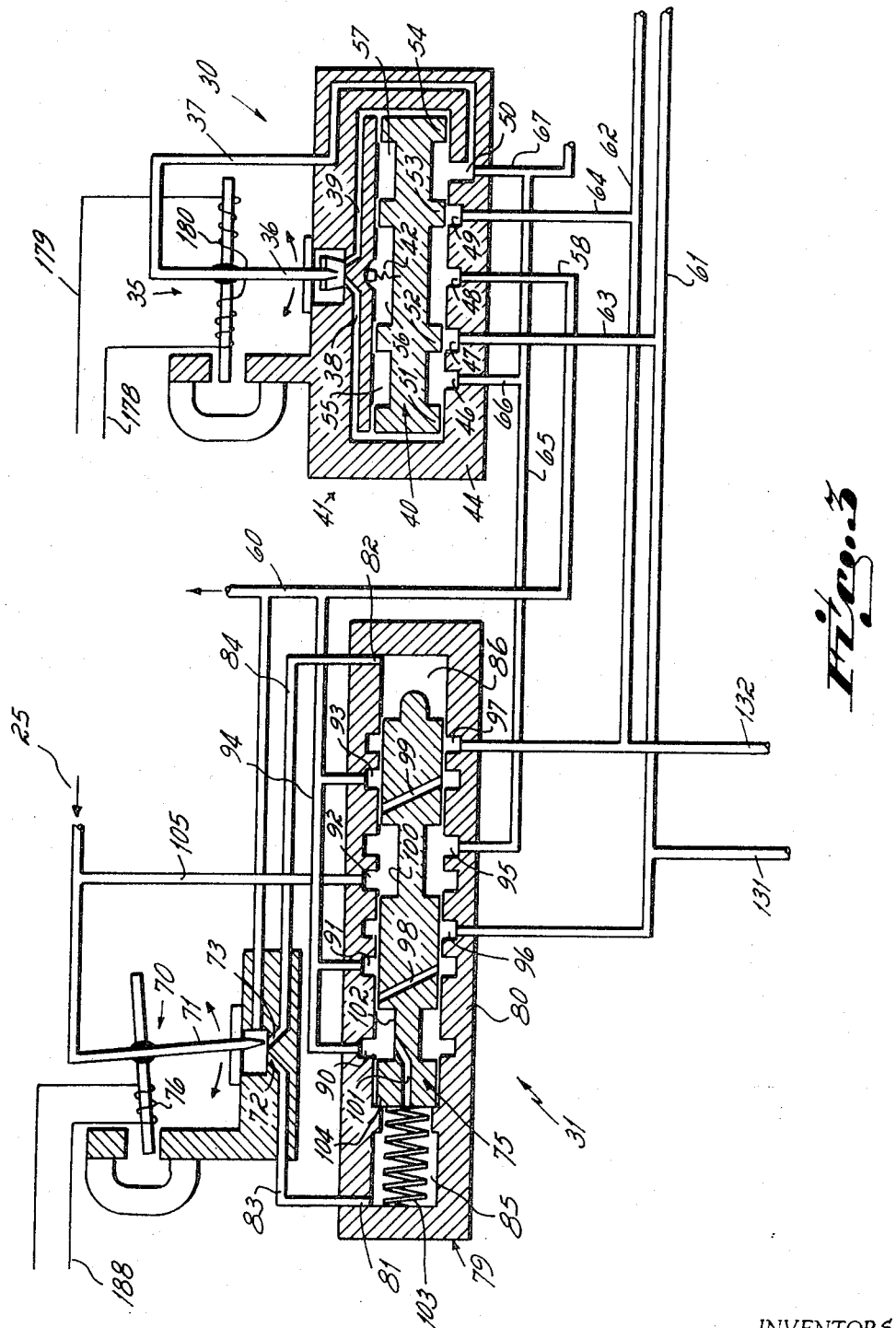

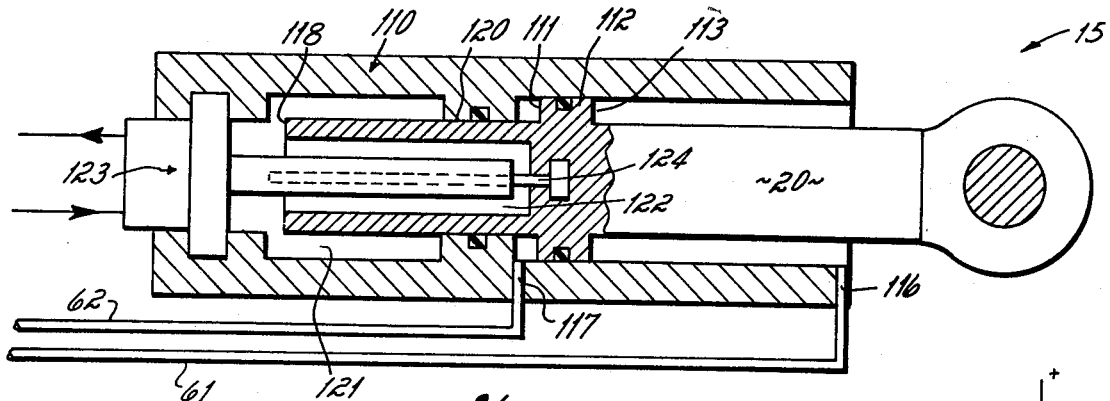
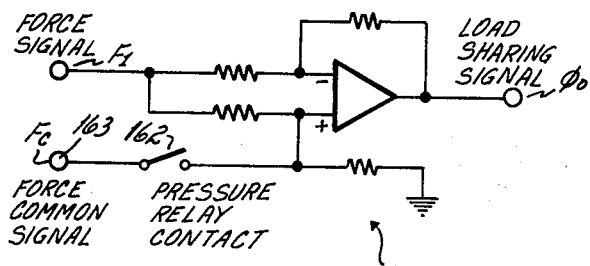
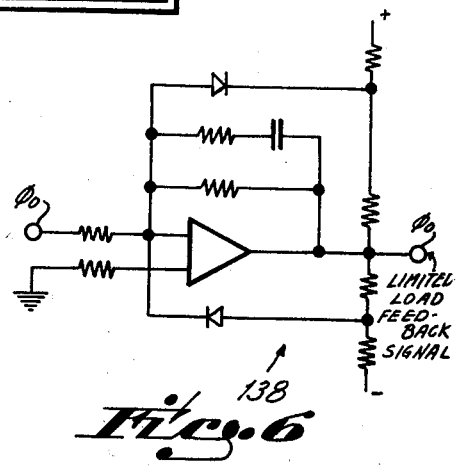
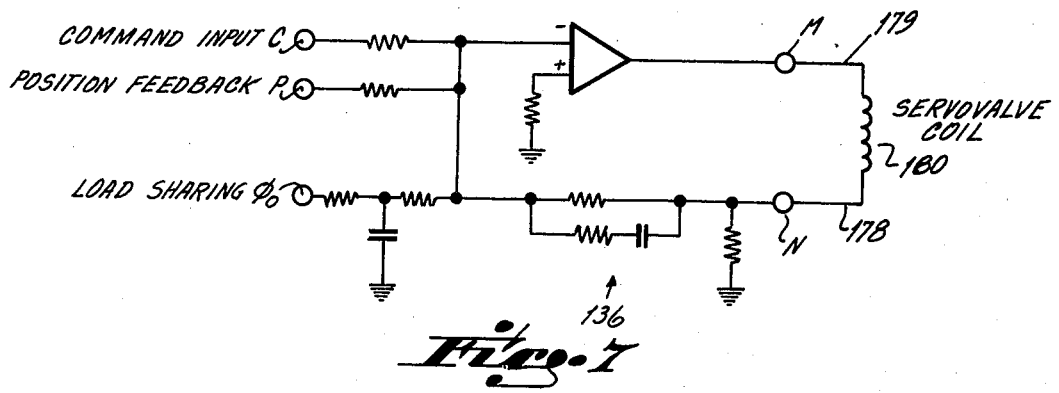

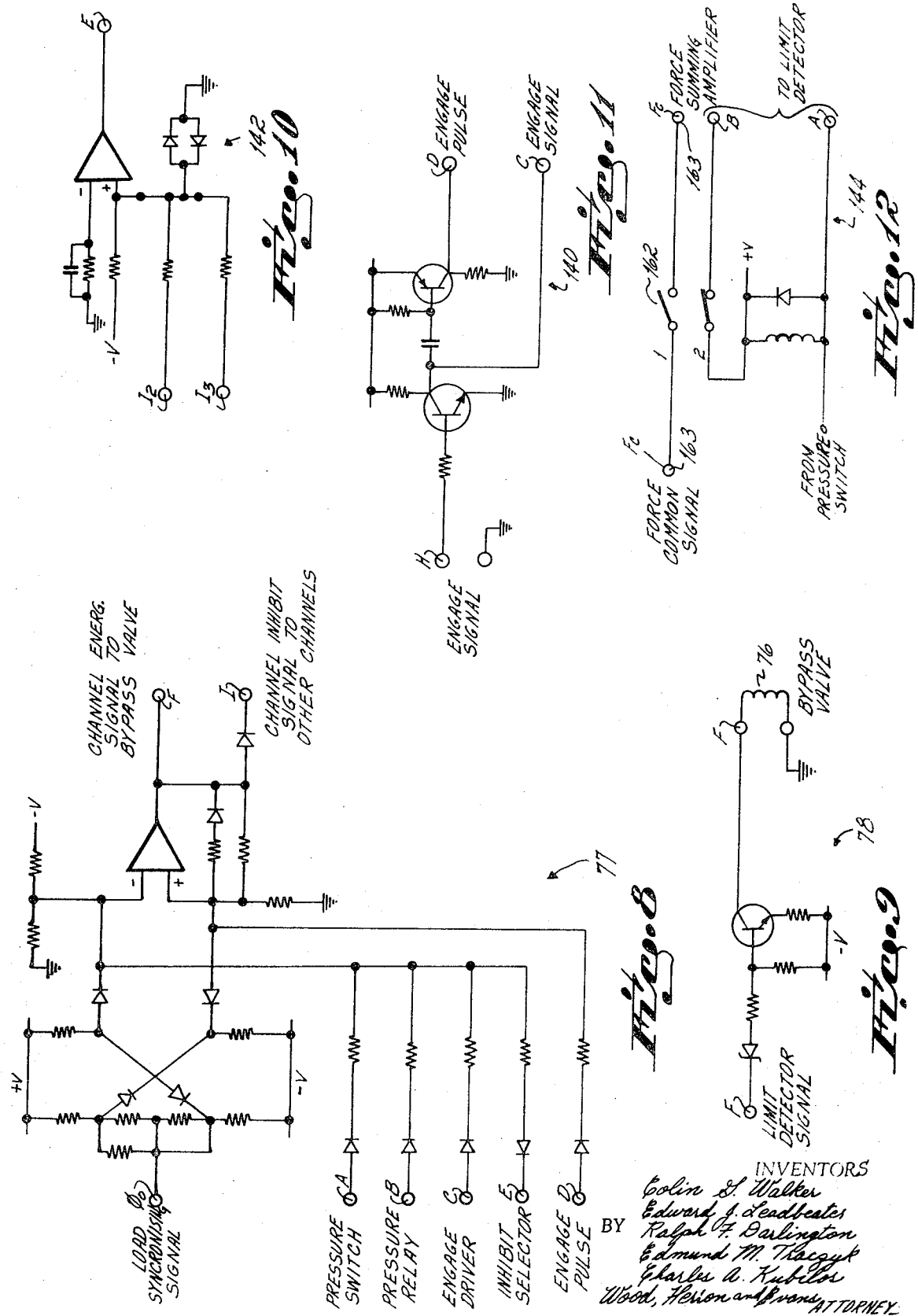

MULTIPLE CHANNEL REDUNDANT CONTROL SYSTEM

This invention relates to multiple channel servo systems, such as multiple channel aircraft control servo systems. While the invention described hereinafter is particularly applicable to aircraft control, it is to be understood that the invention is also applicable to the control of other movable elements in other environments, as for example, any type of movable vehicle control element, machine tool control element, or manufacturing control where failure of the controlled element is extremely critical.

In the field of aircraft control, a hydraulic powered system is conventionally utilized to position or actuate controlled surfaces. One controlled channel, controlled by input commands from the pilot, was formerly sufficient to maintain the desired command and control function within the desired probability of failure. However, in newer very large and high speed aircraft, failure may be catastrophic and accordingly, the probability of failure must be minimized. To that end, it is now common in large and high speed aircraft to provide redundant control systems set with multiple control channels such that failure of one channel does not cause a failure of the system, and consequent loss of the aircraft. As the speeds of the aircraft have increased as well as their size, the acceptable response time for switching out one failed channel of a multiple redundant control system has been reduced, as well as the acceptable null shift and transient movement of the controlled element upon failure of a single channel of the system.

Numerous concepts have been attempted to implement multiple redundant control systems. These include standby channels with switch over from one channel to the standby channel upon failure of a single channel; multiple independent control surfaces, each with its own actuator so that failure of one surface does not result in failure of the system, displacement summing channels in which the resulting displacement of the control surface is effected by multiple actuators, each one of which is displaced some fraction of the commanded displacement, and force summed control systems in which the force imparted to the control element by each one of multiple actuators is some fraction of a commanded force. In each case it is important to detect and warn of any failure so that corrective action can be taken before initiation of a chain of events ending in catastrophy. The choice of system depends upon the overall characteristics of the systems such as the tolerable transient shift which may occur upon failure of a channel, size and weight characteristics of the system, and the acceptable probability of failure.

It has been the primary objective of this invention to provide an actuator control system having a very high safety reliability.

Another primary objective of this invention has been to provide a multiple redundant control system operable to shut down an inoperative or failed channel with a minimum of transient shift of the controlled element possible between occurrence of the failure and shutdown of the channel. To that end, the invention of this application is operable to shut down a channel in approximately 10 milliseconds. This is a particularly short duration of time when it is considered that a current state of the art high-power electrical solenoid requires approximately 25 milliseconds to react to a changed condition.

Still another objective of this invention has been to provide a redundant control system having the safety capability set forth hereinabove and, capable of tolerating both an active or a passive type of channel failure in one or more of the controlled channels. A passive failure is one which switches itself out such as occurs upon loss of either the electrical or the hydraulic control signals. Active failures require majority voting to detect and switch out. In general, there exist two types of active failures: the slow drift and the fast hardover. Slow drift failure may occur as a result of excessive wear of components of the system, local temperature variations not shared by all the channels, or any slow degradation of performance by some component. A fast hardover failure can result from a broken wire, jammed valve or any failure which results in a very sudden change in the state of a component of the channel.

These objectives are achieved and this invention is predicated upon the concept of using a multiple-redundant force-summed electro-hydraulic control system for effecting control of the controlled element. Each channel has its own hydraulic actuator, its own electrical command and feedback control networks, and its own load synchronizing feedback network. The actuator control includes an electro-hydraulic jet pipe valve at the interface of the electrical and hydraulic system. It utilizes an electrical position feedback signal to close the loop of the channel in combination with an electrical load synchronizing feedback signal. The load synchronizing signal is derived in a manner such that the net algebraic sum of the signals on all channels is zero. The load synchronizing feed-back signals therefore have no net effect on the output position of the multiple channels while still correcting interchannel load pressure differences resulting from extraneous inputs, non-linearities, etc. The synchronizing signal is generated by comparison of the force on any one channel against the average of the forces on all channels. This same signal is monitored and utilized to determine either slow drift or hardover failure of a channel. Upon detection of a failed channel, a fast acting electro-hydraulic bypass valve shuts down the failed channel and connects the opposite ends of the hydraulic actuator in the failed channel in a closed loop so that the actuator is free to follow the movements of the other active actuators without imparting any net force on the movable control element.

This system has the advantages of very high reliability, minimum performance degradation and transient shift upon failure of one channel of the multiple channel systems, and relatively low cost for these performance features. It also has the advantage of being applicable to any number of channels, two, three, four or more — real or simulated — depending upon the safety reliability desired.

These and other objects and advantages of this invention will be more readily apparent from the following description of the drawings in which:

FIG. 2 is an enlarged diagrammatic illustration of one channel of the system of FIG. 1.

FIG. 3 is an enlarged cross sectional view of the flow control and bypass valves of the system.

FIG. 4 is an enlarged cross sectional view of one actuator of the system of FIG. 1.

FIG. 5 is a circuit diagram of the force summing and difference amplifier of FIG. 2.

FIG. 6 is a circuit diagram of the lag-lead amplifier circuit of FIG. 2.

FIG. 7 is a circuit diagram of the input summing amplifier of FIG. 2.

FIG. 8 is a circuit diagram of the limit detector circuit of FIG. 2.

FIG. 9 is a circuit diagram of the bypass valve driver circuit of FIG. 2.

FIG. 10 is a circuit diagram of the inhibiting selector circuit of FIG. 2.

FIG. 11 is a circuit diagram of the channel engage driver of FIG. 2.

FIG. 12 is a circuit diagram of the pressure relay circuit of FIG. 2.

Figure 1:
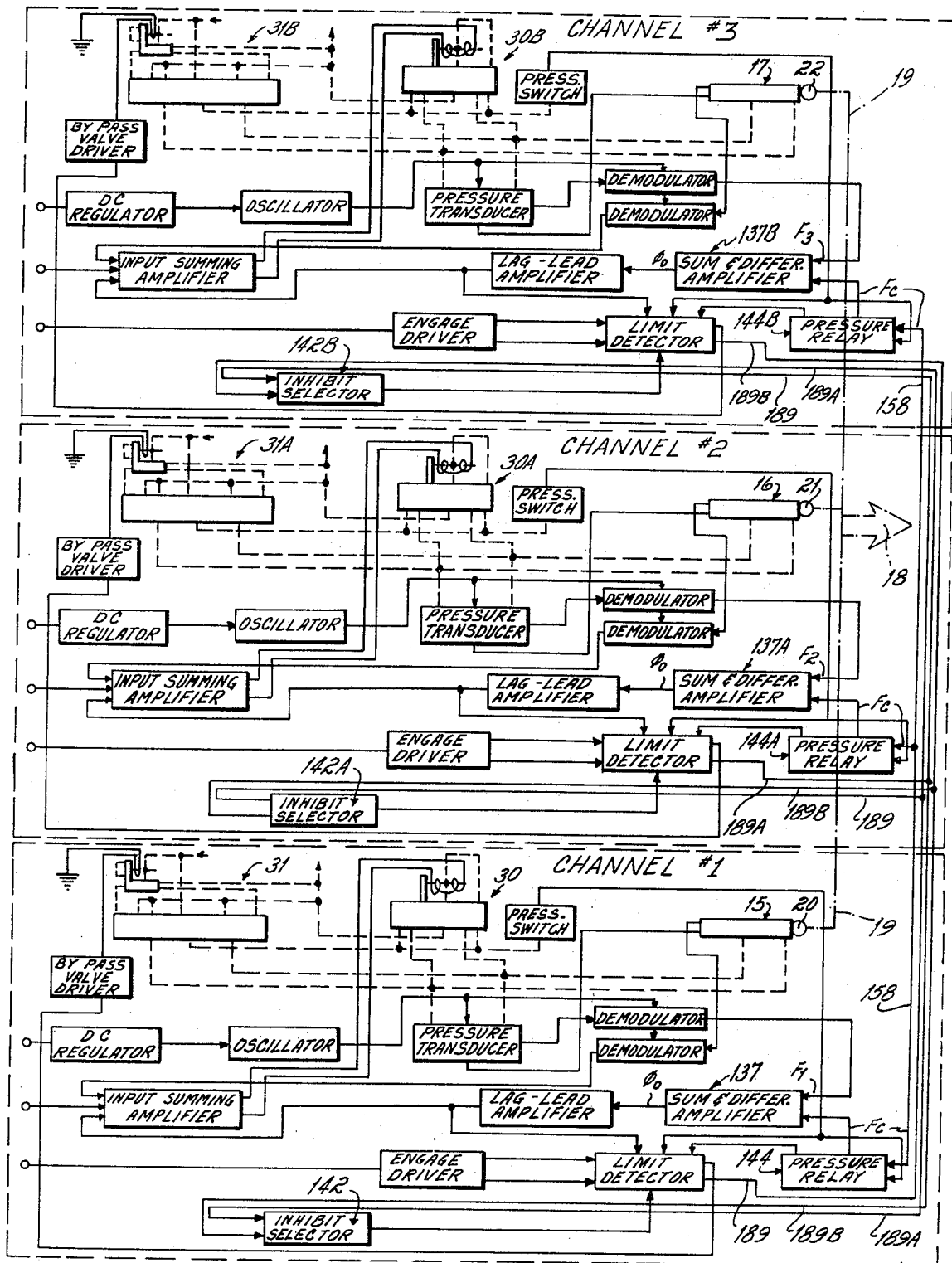
FIG. 1 is a diagrammatic illustration of one preferred embodiment of a three channel control system of this invention.

Referring first to FIG. 1, there is illustrated one embodiment of a triple redundant control system of this invention. In this system there are three channels, each one of which has its own electrical and hydraulic supply and each one of which is operable independently of the other channels to control a hydraulic actuator or hydraulic motor 15, 16 and 17 respectively. The actuators in turn are force summed and operate in parallel to control a single mechanical movement, as for example, the movement of a flap or some other movable element 18 of an aircraft. This element 18 is mechanically tied to the piston rods 20, 21 and 22 of all three actuators as indicated at 19. The system is redundant in the sense that any one of the actuators 15, 16 or 17 is independently capable of controlling or effecting movement of the movable element 18. This redundancy allows any one of the three channels to fail actively without impairing the operability of the control system or any two of the channels to fail passively without impairing the functionality of the system.

Active failure is defined as that type of failure which results in uncontrolled energy being applied to the system. Passive failure is defined as that which removes energy or prevents it being applied when required.

An error detection-correction system in each channel detects all active failures when they occur and then isolates the failed channel such that it no longer contributes to the output or interferes with operation of the remaining channels. An error or failure is detected by observing any significant difference between one channel and the others. When the difference reaches a predetermined value, the channel is considered to have failed. This triggers the correction device which then isolates the channel. For example, in the event of a failure in channel No. 2, the actuator 16 must be isolated so that the two other actuators 15 and 17 can continue to operate and move the movable element 18.

Passive failures are self-isolating in the sense that a failed channel fades out and need not be switched out by the error detection-correction system. Those functions necessary to ensure correct operation of remaining channels still are operated, even with a passive failure.

An active failure requires detection of the failure for its isolation. Since an error is detected by measuring the difference between the state of the supposedly failed channel, and that of the other two, the actively failed channel can only be isolated when those remaining channels outnumber the failed channel. This is usually referred to as "majority vote" where the majority is considered to be correct. Therefore, a three channel actuator, such as illustrated in FIG. 1, can survive only one active channel failure, or two passive channel failures. If only two channels remain, there is no longer a "majority vote" possible to determine which is correct in the event of an active failure.

The three force summed actuators 15, 16 and 17 all apply approximately the same force to the element 18 to effect or maintain a position of the element 18. They are, however, all position controlled i.e., a position signal effects movement of the actuator and the position feedback signal completes the servo-loop to indicate to the control element when a position has been achieved. In order to make up any difference between an input command and a position feedback signal, which difference may exist because of there being three actuators mechanically tied to the same movable element, subsidiary feedback signals related to force are applied to each channel to make up the difference between input and feedback.

Since each of the three channels, No. 1, 2 and 3 are identical, only one has been illustrated in detail. An enlarged detailed view of this one channel — Channel No. 1 — is illustrated in FIGS. 2, 3 and 4. Similar components in each of the three channels have been given the same numerical designation but the channel No. 2 components are followed by the suffix A and the channel No. 3 components are followed by the suffix B.

Referring now to FIG. 2, it will be seen that each channel has an independent pressurized source or supply of fluid indicated generally by the numeral 25. Similarly, each channel has its own source 26 of DC current, its own oscillator or source 27 of AC current, and its own source 28 of a DC input command signal. These sources 25, 26, 27 and 28 are all mutually independent of the corresponding sources of the other channels, such that a failure of one in no way affects a failure in a corresponding source of the other channels.

The hydraulic network of each channel includes, in addition to the hydraulic actuator 15, an electro-hydraulic flow control valve 30 and an electro-hydraulic bypass valve 31. The bypass valve 31 is in actuality a very fast acting shutoff and bypass valve for cutting off the flow of fluid to the actuator in the event of a channel failure. Fluid from the shutoff and bypass valve 31 is normally directed to the flow control valve 30. This latter valve then directs the fluid flow to one or the other ends of the hydraulic actuator in accordance with the command signal from the electrical input control 28.

The electro-hydraulic flow control valve 30 is illustrated in greater detail in FIG. 3. It functions or operates to control the rate and direction of piston rod 20 displacement in proportion to its input electrical currents. One standard off-the-shelf commercially available valve suitable to this application is designated as an Abex 410 jet pipe valve. It consists basically of a dry torque motor 35 which moves a jet pipe 36 in the presence of electrical current. Movement of this pipe in turn directs a jet of oil or fluid entering the pipe via a conduit 37 into two receptor holes 38, 39. Differential pressure, obtained from these receptors 38, 39, moves a second stage valve spool 40. This spool is connected to the jet pipe by a feedback spring 42 which always re-centers the jet and torque motor armature. Thus, the valve spool's position and therefore fluid flow through the second stage 41 of the valve 30, is proportional to the torque motor current.

The second stage 41 of the valve 30 comprises a cylinder 44 within which the valve spool 40 is movable. The cylinder 44 has five ports 46, 47, 48, 49 and 50. Fluid flow to and from these ports is controlled by lands 51, 52, 53, and 54 of the valve spool, between which there are three fluid flow channels 55, 56 and 57. The centermost port 48 of the valve 41 is connected by a fluid flow line 58 to a low pressure return line 60. Ports 47 and 49 are each connected to actuator control lines 61 and 62 by fluid flow lines 63 and 64, respectively. The endmost ports 46 and 50 of the valve 41 are connected to the pressure line 65 by the lines 66 and 67, respectively. Pressure line 65 is normally at system pressure except when flow to the flow control valve 30 is blocked by the valve 31.

As viewed in FIG. 3, movement of the valve spool 40 to the left is operable to connect the actuator control line 62 to the system pressure via lines 65, ports 50 and 49 and line 64. Simultaneously, the other actuator control line 61 is connected to the low pressure or return line 60 via the line 58, ports 48 and 47, and line 63. As may be seen in FIG. 2, this leftward spool movement causes the piston rod 20 of the actuator 15 to be moved rightwardly or outwardly in the actuator cylinder. Alternatively, rightward movement of the spool 40 as viewed in FIG. 3, connects the actuator control line 61 to the pressure line 65 via line 66, ports 46 and 47 and line 63, while simultaneously connecting the other actuator control line 62 to the low pressure or return line 60 via ports 48 and 49 and lines 58 and 64.

The control system of this application uses electronic logic and electronic monitoring to detect failure of a channel. Once failed, the channel must be switched out of the system immediately if the performance of the system is not to be affected by the failure. In other words, there must be a minimum changeover transient at the actuator output upon failure of a channel. Consequently, the offending or failed channel must be quickly removed and its piston bypassed. A system which uses electronic monitoring and logic to control hydraulic output usually introduces an undesirable time lag at the electrohydraulic interface. For example, a fast acting solenoid requires approximately 25 milliseconds switching time. In most aircraft triple redundant systems this is an unacceptable time lag. Many applications require much shorter switching times. The bypass valve 31 is such a quick acting valve, i.e., it responds in approximately 5 milliseconds to switch out the channel on failure of the system.

The bypass valve 31 is generally similar to the flow control valve 30. It consists basically of a dry torque motor 70 which moves a jet pipe 71 in the presence of electrical current. This jet pipe 71 in turn directs a jet of oil into either one of two receptor ports 72 and 73. Differential pressure obtained from these receptors 72, 73 moves the spool 75 of the "second stage" of the valve 31. In this bypass valve though, the spool is not connected to the jet pipe and is not operative to recenter it. Rather, the jet pipe is normally biased to a position in which it directs full flow into the receptor 72. Upon the flow of current in the electrical armature 76 of the torque motor 70, the jet pipe 71 directs hydraulic fluid into the receptor 73. As is explained more fully hereinafter, the flow of current into the armature 76 is controlled by a limit detector circuit 77 passing a current through a bypass valve drive circuit 78.

The second stage 79 of the valve 31 comprises a cylinder 80 within which the spool 75 is slidable. The cylinder 80 has two ports 81 and 82 interconnected by lines 83 and 84 to the receptors 72 and 73 of the dry torque motor 70. These ports 81 and 82 open into chambers 85 and 86 at opposite ends of the spool. In addition to these ports, the cylinder has four ports 90, 91, 92 and 93. Ports 90, 91 and 93 are connected via a line 94 to the main return line 60. The port 92 is connected to the fluid source 25 via line 105. It also has a main pressure output port 95 connected to the pressure line 65 as well as two control ports 96 and 97. These latter two ports are connected to the actuator control lines 61 and 62, respectively.

The spool 75 has a pair of transverse control channels 98 and 99 extending therethrough and operable in the bypass position to interconnect the ports 91 and 96 and the ports 93 and 97. An annular channel 100 in this spool 75 interconnects the pressure channels 92 and 95 in one position of the valve. Additionally, there is in one preferred embodiment of the spool 75 a restricted passage of channel 101 which connects the chamber 85 to an annular channel 102 of the spool. This passage 101 may, if desired, be omitted and the valve is still operable. A compression spring 103 normally biases the spool 75 rightwardly as viewed in FIG. 3.

The valve 31 is biased both mechanically and hydraulically to a bypass position. In the bypass position, fluid flows through the jet pipe 71 into the receptor 72 and into the chamber 85 at the left end of the second stage 79 of the valve. This fluid flow assists the spring 103 in forcing the spool 75 to the right, in which position the channel 98 interconnects the ports 91 and 96 and the channel 99 connects the ports 93 and 97. In this position of the valve, the restricted passage or channel 101 is blocked from port 90 by the end land 104 of the spool so that the supply pressure forces the spool to the right.

Upon the flow of current in the armature 76 the jet pipe 71 is moved rightwardly to the position illustrated in FIG. 3. In this position fluid flow through the jet pipe 71 enters the receptor 73 and flows into the chamber 86 at the right end of the spool. This fluid low then forces the spool against the spring pressure to the left into the position shown in FIG. 3. In this position of the spool, it blocks the flow of fluid in the ports 96 and 97 and opens the pressure output port 95 to the pressure input port 92, the port 92 being connected by the line 105 to the source of fluid pressure 25. Full supply pressure is then supplied to the flow control valve 30. With the spool in this leftwardmost position, the restriction passage 101 through the left end of the spool allows flow to occur from the chamber 85 through the passage 101, port 90 and the line 94 to the return line 60.

The actuator or hydraulic motor 15, illustrated in FIG. 4, is a balanced area hydraulic cylinder. It comprises a cylinder 110 within which the double ended piston rod 20 is slidable. The cylinder or motor 15 is a so-called balanced area cylinder because the effective area of the piston against which the hydraulic pressure acts to effect movement of the piston is the same on both sides. That is, the area of the surface 111 on one side of the piston 112 is the same as the area 113 on the other side of the piston. Fluid is supplied to these opposite sides of the piston through ports 116 and 117 in the cylinder. These ports are connected to the actuator control line 61 and 62, respectively.

The innermost end 118 of the piston rod 20 extends through an annular constriction 120 in the interior of the cylinder 110 and is slidable within an unpressurized cavity or chamber 121 of the cylinder. This end 118 of the piston rod has an end recess or chamber 122 within which a linear variable displacement transducer (L.V.T.D.) 123 is mounted. This L.V.T.D. 123 is flange mounted at the inner end of the cylinder and has its housing extending into the recess or chamber 122. The probe 124 of the L.V.T.D. is fixed to the piston rod so as to be movable therewith. As is explained more fully hereinafter, this L.V.T.D. functions to provide an electrical feedback signal to an input summing amplifier which is proportional to the piston rod position.

The two actuator control lines 61 and 62 are connected to a differential pressure transducer 130. As explained more fully hereinafter this pressure transducer 130 provides electrical signals to a load synchronizing circuit in proportion to cylinder or actuator load pressures. These pressures are directly proportional to the force output of the piston of the actuators. The transducer is a conventional, commercially available inductive type of pressure transducer which employs a diaphragm configuration for sensing pressure differentials between the two lines 61 and 62.

There is a pressure switch 135 connected to the pressure line 65 on the output side of the bypass valve. This pressure switch is a conventional type of switch which provides an electrical logic signal to the limit detector 77 to indicate the presence or absence of hydraulic supply pressure.

The electrical components of each channel of the system in addition to the two transducers and the pressure switch heretofore described, comprise an input summing amplifier 136, a force summing and difference amplifier 137, a lag-lead amplifier 138, a channel engage driver circuit 140, the limit detector 77, an inhibit selector 142, the bypass valve driver 78, and a pressure relay 144. The electrical circuit internally of each of these components 137, 138, 136, 77, 78, 142, 140 and 144 is depicted in FIGS. 5 through 12, respectively.

The AC pressure signal from the pressure transducer 130 is demodulated by the demodulator 151. The DC output force signal F1 from the demodulator 151 is transmitted over a lead 160 to the sum and difference amplifier 137. A circuit diagram of the amplifier 137 is depicted in FIG. 5.

The demodulated pressure or force signals F1, F2, F3 of all channels are summed and averaged and each signal subtracted from the average to produce a load synchronizing feedback signal. This is accomplished by tying together via the lead 158 the force common contacts 163 of the sum and difference amplifier 137, 137A and 137B of all three channels (see FIG. 1). The tying together of the Fc contacts 163 of each channel occurs through a pressure relay contact 162 of the pressure relay 144 (see FIGS. 2, 5 and 12) so that a force signal of a failed channel is automatically dropped out of the comparison by dropping that signal from those that are summed.

The load synchronizing feedback signal $\phi_0$ on lead 165 of the sum and difference amplifier 137 is then automatically proportional to the difference between the average force signal of all operative channels and the force signal of its own channel. This output signal is the synchronizing signal which is monitored and used to shutdown a failed channel. It is also used as a subsidiary feedback signal to the servo system. When this load synchronizing feedback signal exceeds a preset value, as for example, 300 psi "error" at one channel, the limit detector 77 of the channel changes state and closes down the channel.

The load synchronizing feedback signal on lead 165 is fed into the lag-lead amplifier 138 (FIG. 6) via the lead 165. One function of the lag-lead amplifier 138 is to differentiate between high speed or transient errors and low speed or accumulated errors so as to enable the limit detector 77 to respond to both at two different pressure levels.

In general, the limit detect system for switching off a failed channel must be responsive to two basic types of failure: the slow drift channel failure and the fast hardover failure. HE SLOW DRIFT TYPE OF FAILURE CAN OCCUR OWING TO EXCESSIVE WEAR, LOCAL TEMPERATURE VARIATIONS NOT SHARED BY ALL THE CHANNELS, OR ANY SLOW DEGRADATION OF PERFORMANCE BY SOME COMPONENT OF THE CHANNEL. A fast hardover failure can result from a broken wire or fluid line or a jammed valve, etc. Slow drift variations are always present to some degree and are usually considered when within predetermined limits to be a part of the normal operation. However, when such drifts reach a predetermined amplitude, and persist for a predetermined time, they become unacceptable and hence, are considered as a channel failure. An accumulated or steady-state slow drift synchronizing signal equivalent to a pressure error of 300 psi at the actuator will trip the limit detector. High-speed signals such as hydraulic "noise" or hardover hydraulic failures are attenuated by a factor of six and must therefore have an amplitude equivalent to 1,800 psi to trip the limit detector 77.

A second function of the lag-lead amplifier 138 is to reduce the actuator transient in the event of a channel failure. Assuming one of the three channels has an accumulated error due to some faulty component, immediately prior to shutdown of the faulty channel it will have a synchronizing feedback signal equal to the limit setting of the limit detector 77. The sum of all synchronizing feedback signals on all channels is always zero. The other two (good) channels will therefore each have synchronizing feedback signals approximately 50 percent of limit setting when the faulty channel has a synchronizing feedback signal equal to the limit setting. The faulty channel then limit detects and closes down. At the instant of close down of the faulty channel, the remaining channels have no accumulated errors and their synchronizing feedback signals must therefore immediately return to zero from 50 percent of the limit setting. In the absence of the lag-lead amplifier these signals would immediately step down to zero and the actuator would effectively suffer a step position command equal to 50 percent of the limit detector setting. The lag-lead amplifier 138 integrates this step down command signal over a relatively long period (as for example 10 seconds) and allows the actuator to move slowly to its new position.

Before the synchronizing feedback signal from the lag-lead amplifier 138 is fed as an input into the input summing amplifier 136, it is first limited by the circuit (FIG. 6) internally of the lag-lead amplifier. This circuit limits the synchronizing feedback signal on lead 171 to some predetermined value, as for example in the preferred embodiment, to around 33 percent above the channel failure detect setting of the limit detector 77.

When a hardover failure occurs in one channel, the load synchronizing signal in that channel will increase rapidly to its limit setting. The signals on the other two channels will increase at approximately half the rate of that on the failing channel. However, as the failing channel will not be completely depressurized for over 5 milliseconds, the other two signals may well eventually reach their limits. To ensure correct detection, the limit detector operates at a speed high compared to that of the rate of increase of the load synchronizing signal. The logic of each channel is interconnected with each of the other channels so that only one channel can shutdown. If four channels are used, then a temporary cross inhibit is applied upon a first failure and a permanent cross inhibit after two failures.

The input summing amplifier 136 of each channel receives an electrical command input from one of three similar command sources 28. This command signal, a varying DC input, is transmitted via a lead 175 to the input summing amplifier 136. The command signal C is algebraically summed with a position feedback signal P on lead 176 and a synchronizing feedback signal on lead 172. The position feedback signal, indicative of the position of the actuator 15 is transmitted as an AC signal on lead 177 to a demodulator 150 where it is demodulated and then transmitted via the lead 176 to the input summing amplifier 136. The resultant difference signal causes a proportional current in leads 178 and 179 to the torque motor coils 180 of the electro-hydraulic flow control valve 30. Flow through the valve 30 then produces a channel piston or actuator velocity which depends on the piston area and the opposing load.

Since the complete system comprises three identical channels having three identical actuators 15, 16 and 17 each of which acts independently on the output load 18, and is mechanically connected to it by the torque bar 19, each piston applies a proportionate force to the load 18. In this sense then, the pistons are force summed onto a common load. Manifestly though, in a three channel system in which each channel operates independently and is position controlled, the force outputs cannot be identical. Differences in channel forces or channel pressures, the two of which are almost directly proportional, arise from extraneous inputs such as null shifts, non-linearities, wear, etc. Consequently, since the output position of all channels are physically restrained by the torque bar 19 to be the same, the associated position feedback signals to the input summing amplifier 136 on lead 176 may or may not balance the command signals on lead 175. The resultant error signals, when applied to high pressure gain servo valves, cause unequal loads to be present among the channels and a condition exists such that the channels can exert forces in opposite directions and yet their sums still balance the external load. This can result in reduced force gain as seen by the external load, fatigue problems at the output summing point, and possibly hunting. To eliminate such undesirable features, a load synchronizing system is incorporated in combination with the force summing system. The synchronizing circuit introduces the synchronizing feedback signals on lead 172 into the input summing amplifier to make up any difference between command input and position feedback signals on the leads 175 and 176, respectively. The synchronizing network is designed such that the algebraic sum of the synchronizing feedback signals on the leads 172 of all three channels is always zero. Therefore, any change in one signal is opposed by the other two. The synchronizing network therefore has virtually no net effect on the positioning of the actuators 15 of the system. It serves only to balance the three force summed channels.

As was stated hereinabove, the load synchronizing signal from the lag-lead amplifier is monitored so as to trip the limit detector 77 in the event that the synchronizing signal exceeds preset values (indicative of a slow drift 300 psi error or an 1,800 psi hardover error in the preferred embodiment). To that end, the load synchronizing signal is fed via lead 173 into the limit detector 77. The limit detector 77 then shuts off the channel and the signal to the bypass valve 31 when the synchronizing signal exceeds the preset value.

The detector 77 also monitors the state of the limit detectors in each of the other two channels. To that end, a signal is fed into the limit detector 77 from the inhibit selector 142 via the lead 181. In the event of the presence of a signal on lead 181 indicating the shutdown of one or the other of the other two channels, the limit detector goes to an ON condition in which it remains ON and maintains a blocking signal to the bypass valve 31 irrespective of the value of the load synchronizing signal on lead 173. In other words, a signal on lead 181 indicating the shutdown of one of the other channels serves as a blocking signal to prevent the synchronizing signal from shutting down any other channel. Consequently, only one channel can fail actively.

In addition to these signals the limit detector circuit 77 also receives as an input two signals C and D from the engage driver circuit 140. The C signal on lead 184 from the engage driver 140 allows the limit detector to remain in an ON condition so long as there is a channel arming signal H supplied from a power source 185 to the engage driver 140. The D signal on lead 186 is a pulsed signal from the engage driver 140. This engage pulse signal D turns on the limit detector when the engage signal H of the channel is initially supplied to the channel. Thereafter the C signal on lead 184 holds or maintains the limit detector in an ON condition until either the system is turned off so that there is no power to the engage signal H or the limit detector 77 is turned off as the result of the load synchronizing signal on lead 173 exceeding the preset limit, or as a result of the pressure switch signal indicating loss of hydraulic pressure.

The limit detector also receives as an input via lead 190 a pressure switch signal A and via lead 191 a pressure relay signal B. These two signals change states in the event of a loss of hydraulic pressure in the channel. In the event of a loss of hydraulic pressure, both signal A and B are operative to turn off the limit detector in the absence of a blocking signal E on lead 181. Signal B will be operative to turn off the limit detector in the event of a failure of the pressure relay coil.

So long as the limit detector 77 is in the ON condition, a bypass valve driver signal F is supplied via lead 187 to the bypass valve driver circuit 78. This circuit in turn supplies current via lead 188 to the armature 76 of the bypass valve 31 and maintains the valve in an ON condition. In the event that the limit detector 77 is turned off, it supplies an I signal on lead 189 to the inhibit selectors 142A and 142B of the other two channels. The inhibit selectors 142A or 142B then supply blocking signals via the leads 181 to the limit detector of the other two operative channels so as to maintain the limit detectors of the other operative channels in the ON condition.

OPERATION

The logic of the system is so designed that when electric and hydraulic power are supplied to each of the three channels of the system, all three channels are immediately switched to the ON condition.

Prior to the limit detector 77 supplying a signal via lead 187 to the bypass valve driver 78 so as to supply current to the coil of armature 76 of the bypass valve 31, the main spool 75 of the pressure error detect valve or bypass valve 31 is mechanically biased to the right or OFF Position by the compression spring 103. The jet pipe 71 of the valve is mechanically biased to the left so as to direct its flow into the port 72 and assist the spring 103 in maintaining the spool 75 in the rightmost position. Full flow is therefore projected to the lefthand receiver port 72 and hence to the left end of the spool. The valve is thus mechanically and hydraulically held in the bypass position. The hydraulic supply line or pressure line 65 of the flow control valve is then held closed and the cylinder ports 116 and 117 of the actuator are thereby short circuited.

Upon a signal being supplied via lead 187 to the bypass valve drive 78 of the bypass valve 31, the rated current for the valve is passed through the coil 76 of the valve so as to bias the jet pipe 71 of the valve to the right as viewed in FIG. 3. Full pressure is then applied to the right hand end of the main spool 76 so as to move it to the left. When this occurs, supply pressure from fluid source 25 is then passed through fluid line 105 and ports 92, 95 of the valve 31 to the pressure line 65. This pressure in line 65 then actuates or closes the pressure switch 135. Closing of this switch 135 then results in a holding signal being supplied via leads 156, 190 to the limit detector 77 and via the leads 156, 152, through relay 144, and via lead 191 to the detector 77. This signal then maintains the limit detector in a condition in which it holds the bypass valve 31 open.

Each channel receives the identical command input from a source of electrical command signal 28. This signal is fed via lead 175 to the input summing amplifier 136 where the signal is summed with the position feedback signal P on lead 176 and the synchronizing feedback signal $\phi_{oc}$ on lead 172. The resulting summation produces an error voltage which in turn causes a proportional current output on leads 178 and 179. This proportional current output passes through the torque motor coils 180 of the flow control valve 30 and is operable to position the jet pipe 36 of the valve so as to direct a greater or lesser amount of fluid toward one or the other of the ports 38 and 39 of the valve. This differential in flow in the ports 38 and 39 effects displacement of the spool 40 of the valve toward one or the other ends of the flow control valve 30. Depending upon the direction of spool displacement, one actuator control line 61, 62 is connected to the pressure line 65 and the other control line 61 or 62 is connected to the return line 58. Flow through the flow control valve 30 produces an actuator piston velocity which depends on the piston area and the opposing load. To complete the servo loop, a feedback signal is derived from the L.V.D.T. 123 measuring piston displacement relative to that of the cylinder body. This position feedback signal is then transmitted via lead 177 through the modulator 150 and lead 176 to the input summing amplifier.

The three piston outputs are force summed onto the common load 18 acting through the torque bar 19. The problem of load synchronizing among the channels is solved by the synchronizing system which includes the pressure transducers 130 and the force sum and difference amplifiers 137. These amplifiers 137, 137A and 137B receive force signals $F_1$, $F_2$, $F_3$ indicative of the load or force on each channel from the pressure transducers of the channel. In addition, the sum and difference amplifiers 137, 137A and 137B are connected by lead 157 through the pressure relays 144 and lead 158 to the pressure or force signals on the other channels. The circuit resulting from these inter-connections causes an algebraic comparison within the sum and difference amplifier 137, the output of which on lead 165 is proportional to the difference between the pressure in the channel and the average value of the pressure in the other operative channels. This load synchronizing feedback signal on lead 165 is then processed through the lag-lead amplifier 138 and is transmitted via lead 173 to the failed channel limit detector 77 and to the input summing amplifier 136 on line 172.

The synchronizing network is designed so that the algebraic sum of the three subsidiary feedback signals on the leads 172, 172A and 172B of the three channels is zero. Therefore, any change in one signal or load pressure, is opposed by the other two and the three signals have no net effect on the controlled element 18 but they do compensate for interchannel differences in position feedback signals and allow the channels to be force summed even though they are position feedback servo loops.

This load synchronizing feedback signal is also monitored to determine when a pressure or force on an actuator 15 of one channel becomes unacceptable and, hence, a failure. Since the signals algebraically sum to zero it follows that as the signal on one channel increases to some value, those signals on the other two channels increase in the opposite sense and achieve only half that value. Consequently, the load synchronizing feedback signal on lead 172 of a failed channel achieves a predetermined authority limit before that feedback signal on the other two channels achieves the same limit value. It is therefore a reliable indication that a failure has occurred in that channel which first reaches the predetermined limit value.

So long as the load synchronizing feedback signal remains within the authority limits, indicating that the channel is operating properly, current in the coil 76 or the bypass valve 31 maintains the channel in a switched ON condition. When the amplitude of the signal on lead 171 reaches or exceeds the authority limits indicating that a failure has occurred in the channel, the limit detector 77 switches and turns OFF the bypass valve driver 78. This results in the loss of current flow to the coil 76 and the jet pipe 71 of the valve 31 is shifted to its spring biased OFF position.

When the pressure error valve 31 switches, the spool of the valve moves to the right as viewed in FIG. 3. In so doing, the spool 75 of the valve cuts off flow of supply pressure fluid through port 92 to port 95, so that the pressure switch 135 of the failed channel trips. In this position of the spool, both actuator control lines 61 and 62 of the failed channel are connected by the spool channels 98 and 99 to the ports 91 and 93. These ports 91 and 93 are both connected to the return or low pressure line 60 of the fluid circuit. In this position of the bypass valve, then the actuator 15 of the failed channel is free to move or follow the movements of the other two operative channels without imparting any net force on the system.

Upon tripping of the limit detector 77, numerous adjustments occur in the electrical logic of the failed channel. Specifically, the electrical signals A and B on leads 190 and 191 change state because of the pressure switch 135 being turned off and the pressure relay 144 being opened. The engage pulse signal D on lead 186 is a one shot signal which only occurs when the channel is turned on initially so this signal is now in an OFF state. The output signal from the limit detector 77 of the first channel changes state and sends out an inhibit blocking signal to the other channels. This blocking signal then insures that the limit detector of the two other channels remains ON and that the bypass valves 31 of the other two channels cannot switch OFF because of their synchronizing signals exceeding the preset limits. Even if the pressure switches 135 of the two operative channels should fail, the blocking signal on lead 189 will switch ON the inhibit selector of the other two channels so that their output blocking signal E maintains the limit detectors 77 of the two operative channels ON.

The loss of the pressure switch 135 signal A on the lead 152 also opens the pressure relay 144 and readjusts the force summing and difference circuit This automatically results in compensation of the other two channels for the loss of the pressure signal of the inoperative or failed channel.

While only a failure of the number one channel has been described in detail in this description, it will readily be appreciated that an active failure of either one of the other two channels operates in exactly the same manner to switch the logic of the remaining two operative channels so as to maintain the system in an operative condition while simultaneously switching out the third or failed channel. Because the system requires majority voting, it cannot tolerate more than one active failure.

A passive failure, which does not rely upon the failure detection system for switching out the failed channel can still be tolerated after one channel has actively failed and has been switched out. The type of failure considered to be passive would be loss of supply pressure, blown seals, split manifolds or a loss of electrical power supply, etc. Any one of these events will result in the spring 103 forcing the error detection valve or bypass valve 31 to the right as viewed in FIG. 3, so that the bypass valve will be in its bypassed condition and will thereby isolate the passively failed channel.

While only one preferred embodiment of the invention incorporating three channels has been described in detail hereinabove, those persons skilled in the arts to which this invention pertains will readily appreciate numerous changes and modifications such as the increase of the number of channels to four or more which may be made without departing from the spirit of our invention. Therefore we do not intend to be limited except by the scope of the appended claims.

Having described our invention, we claim:

1. A multiple channel servo system comprising a plurality of separate servo control channels, each channel having an input path to receive an electrical command input signal and a hydraulic actuator having a displaceable output element to produce a displacement output in response to a command signal produced in the channel, each channel also having means to feed back an electrical channel feedback signal from the displaceable output element to the input path to cancel out the control signal when the required channel output has been produced, the system including a device coupled to the output element of all the channels and having an output member to produce a system displacement output dependent upon the sum of the force outputs of all the channel output elements, the improvements which comprises
a failure detect means in each channel operative to hydraulically disconnect a failed channel from the system, said failure detect means including a jet pipe electro-hydraulic bypass valve operative to shut down a failed channel when an error exceeds a preset limit.

2. The multiple channel servo system of claim 1 in which the failure detect means is responsive to either a slow drift failure of the channel or a fast hard over failure of the channel.

3. The multiple channel servo system of claim 1 in which the failure detect means is responsive to a small magnitude slow drift error signal or a large magnitude fast hard over signal to hydraulically disconnect the failed channel from the system.

4. In a multiple channel servo system of the type having a plurality of separate redundant force summed servo channels, each channel having a source of an input command electrical signal and a hydraulic output actuator movable in response to the electrical input command signal and means for producing an electrical position feedback signal in response to movement of the actuator, the improvement which comprises
means for detecting a failed channel when the force on the channel exceeds some predetermined value in relation to the other operative channel, and
disconnect means responsive to said failure detect means for hydraulically disconnecting the actuator of the failed channel from the system and for connecting it in a closed hydraulic loop so that it follows the operative channel without affecting operation of the operative channel, said disconnect means including an electro-hydraulic jet pipe valve.

5. The multiple channel servo system of claim 4 wherein the failed channel detect means includes means to compare the force on each channel against the average force of the multiple channels and to actuate a disconnect valve in response to the force on the channel exceeding the average force by a predetermined value.

6. The multiple channel servo system of 4 in which the failure detect means is responsive to either a slow drift failure of the channel or a fast hard over failure of the channel.

7. The multiple channel servo system of claim 4 in which the failure detect means is responsive to a small magnitude slow drift error signal or a large magnitude fast hard over signal to hydraulically disconnect the failed channel from the system.

8. In a multiple channel servo system of the type having a plurality of separate redundant force summed servo channels, each channel having a source of an input command electrical signal, an hydraulic output actuator movable in response to the electrical command signal and means for producing an electrical position feedback signal in response to movement of the actuator, each channel further having means to disconnect the actuator of the channel from the system upon failure of the channel, the improvement wherein
the failed channel disconnect means is responsive to both sudden hard over large magnitude force error signals and more prolonged smaller magnitude drift error signals to disconnect the actuator of the failed channel from the system, said disconnect means including a lag lead amplifier circuit operative to integrate input signals and generate an output force error signal the amplitude of which is a function of time.

9. The multiple channel servo system of claim 8 wherein the disconnect means is operable to actuate a hydraulic valve which disconnects the actuator of the failed channel from the system.

10. In a multiple channel servo system of the type having a plurality of separate redundant force summed servo channels, each channel having a source of an input command electrical signal, an hydraulic output actuator movable in response to the electrical command signal and means for producing an electrical position feedback signal in response to movement of the actuator,
means for generating an average force signal having a characteristic representative of the average magnitude of force on all operative channels,
means for comparing the force of each channel with the force of the average channel and for generating a synchronizer feedback signal having a characteristic representative of the difference between the force on the channel and the average force on all the channels,
means for utilizing both the position feedback signal and the force error synchronizer feedback signal to control movement of the actuator in response to the command signal, and failure detect means including a jet pipe electrohydraulic bypass valve operable upon the synchronizer feedback signal exceeding some preset value to disconnect a failed channel from the system.

11. The multiple channel servo system of claim 10 in which the algebraic sum of the synchronizer feedback signals of all operative channels is zero.

12. The multiple channel servo system of claim 10 in which the failure detect means is responsive to both a small magnitude slow drift synchronizer signal or a large magnitude fast hard over synchronizer signal.

* * * * *